United States Patent [19]

McEntire et al.

[11] 4,107,096

[45] Aug. 15, 1978

[54] LOW FOAMING BETA-AMINO PROPIONIC ACID SURFACE ACTIVE AGENTS

[75] Inventors: Edward E. McEntire; Robert M. Gipson, both of Austin, Tex.

[73] Assignee: Texaco Development Corp., New York, N.Y.

[21] Appl. No.: 840,940

[22] Filed: Oct. 11, 1977

[51] Int. Cl.$^2$ .......................... C11D 1/88; C11D 1/90; C07C 101/04
[52] U.S. Cl. .................................. 252/546; 252/356; 252/DIG. 7; 260/501.11; 260/534 M
[58] Field of Search ................ 252/548, 527, DIG. 7, 252/DIG. 13, 356; 260/534 M, 501.11; 424/70

[56] References Cited

U.S. PATENT DOCUMENTS

| | | | |
|---|---|---|---|
| 2,468,012 | 4/1949 | Isbell | 252/DIG. 7 X |
| 2,619,467 | 11/1952 | Isbell | 252/DIG. 7 X |
| 3,855,156 | 12/1974 | Marumo | 252/546 X |
| 3,912,662 | 10/1975 | Martinsson et al. | 252/DIG. 7 X |
| 3,954,845 | 5/1976 | Martinsson et al. | 252/DIG. 7 X |
| 3,974,208 | 8/1976 | Duozinski et al. | 252/DIG. 13 X |

*Primary Examiner*—Harris A. Pitlick
*Attorney, Agent, or Firm*—Carl G. Ries; T. H. Whaley; James L. Bailey

[57] ABSTRACT

Low foaming beta-amino propionic acid surface active agents are described having the following formula:

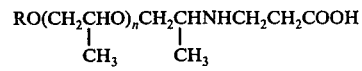

where R is a $C_6$ to $C_{18}$ aliphatic hydrocarbon radical and $n$ has an average value of from 0 to about 13.

The compounds of this invention produce only weak foams as compared with prior art beta-amino acids and have improved solubility and wetting properties over the entire pH range as compared to such prior art beta-amino acids. The compounds of this invention are particularly desirable for use either alone or in combination with other surface active agents and detergents in many washing and wetting applications where foaming is an undesirable characteristic. The compounds are also useful as emulsification agents.

4 Claims, No Drawings

LOW FOAMING BETA-AMINO PROPIONIC ACID SURFACE ACTIVE AGENTS

BACKGROUND OF THE INVENTION

This invention relates to surface active agents and particularly amphoteric surfactants formed from amino acids.

Amphoteric surfactants have been long used and are well known for their properties of having both a cationic and anionic moiety in the same molecule. They are usually prepared by reacting a fatty amine with either acrylic acid or an acrylate ester to form beta-amino propionic acids. Primary alkyl amines contaiing 10 to 18 carbon atoms are condensed at 25° to 30° C with methyl acrylate to form the N-alkyl, beta-amino propionates as described in the U.S. Pat. No. 2,468,012 owned by General Mills, Inc. These products are described as being useful as detergents and foaming, wetting or emulsifying agents. U.S. Pat. No. 3,974,208 describes some of the specific amphoteric surface active agents and their manufacture which are useful as bacteriacide and foaming agents for use in shampoos. As described in the General Mills Chemicals, Inc., General Technical Bulletin 15B, amphoteric surface active agents are characterized by exhibiting changes in foaming, wetting, solubility and detergent properties with a change in pH of the solution in which the surface active agent is dissolved. Characteristically, in acidic solutions the amphoteric surface active agent is a cationic amine salt, and, in alkaline solution, an anionic carboxylate salt. If the cationic and anionic properties of the amphoteric surface active agent are in balance, the double ion is both positive and negative at the same time. This range of balance is known as the isoelectric range and the amphoteric surface active agent exhibits its minimum solubility in water, minimum foaming and minimum wetting properties. While this variance in properties with the pH of the solution is advantageous for some applications it is desirable that the variance not occur in other circumstances, particularly when a cleaning problem is involved which requires the use in situations of unknown acidity or alkalinity. Surprisingly the compounds of this invention have only slight changes in solubility over the entire pH range and exhibit superior wetting properties and a weak foam strength desirable for use in situations where foaming is undesirable.

SUMMARY OF THE INVENTION

Low foaming surface active agents having both cationic and anionic properties are disclosed which exhibit relatively uniform solubility and surface active properties over the entire pH range are prepared from aminated propoxylated aliphatic hydrocarbons having from about 6 to about 14 carbon atoms in the aliphatic hydrocarbon radical by reacting the aminated propoxylate with acrylic acid at a temperature of from about 25 to about 200° C and ambient rto about 10 atmospheres pressure to produce a beta-amino propionic acid of the following formula:

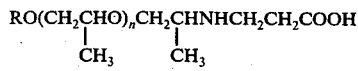

where $n$ has an average value of from 0 to about 13.

DESCRIPTION OF THE PREFERRED EMBODIMENTS

The low foaming surface active amino propionic acids of this invention are described by the formula as set forth in the above summary of this invention. While the aliphatic hydrocarbon radical may contain from 6 to about 18 carbon atoms it is especially preferred that the aliphatic hydrocarbon radical contain from about 8 to about 14 carbon atoms and that the radical be a linear alkyl radical, it being understood, of course, that any acyclic hydrocarbon radicals are suitable. While the average value for "$n$" may be from 0 to about 13, the range from 0.5 to about 13, is especially preferred, with the most preferred range being 0.5–1.0. Since the propoxylation of hydroxyl-containing materials, such as the aliphatic hydrocarbon alcohol initiators used in the practice of this invention, results in a mixture of propoxylates having differing chain lengths, the values for $n$ are average values as is well understood by those skilled in the art.

As stated, the base compounds from which the beta-amino propionic acids of this invention are prepared are long chain, preferably linear, alcohols having from 6 to about 18 carbon atoms and the compounds are prepared by propoxylating such alcohols with at least one mole of propylene oxide to provide the precursor to the amine used in the preparation of the compounds of this invention.

The alcohols are standard items of commerce derived from any of several processes including hydrogenation of acids or esters from natural fats, the so-called "Ziegler" alcohol process, the hydroformylation of olefins, or the oxidation of paraffins. While it is preferable that the alcohol used be substantially linear in nature, some branching may be present in the alkyl portion of the molecule.

The propoxylation reaction is conducted by those methods well known to those skilled in the art by reacting the alcohol with propylene oxide in the presence of an acid or alkali catalyst, usually an alkaline material such as potassium hydroxide, for example. After the reaction is concluded, the alkaline catalyst is neutralized with an acid and the product recovered.

The propoxylated alcohols are reacted with the ammonia using a known method of ammonlysis such as, for example, that described in U.S. Pat. No. 3,654,370 wherein the propylene oxide adduct of a polyhydric material is reacted with ammonia in the presence of a hydrogenation-dehydrogenation catalyst to form polyether diamines and higher amines. The preferable catalyst for the ammonolysis will be one containing nickel, copper and chromium as described, for example, in U.S. Pat. No. 3,152,998. This catalyst is generally prepared by the reduction of a mixture of the oxides of nickel, copper and chromium in the presence of hydrogen at a temperature within the range of about 250° to 400° C. Calculated on an oxide-free basis, the catalyst contains from 60 to 85 mole percent nickel, 14 to 37 mole percent copper and 1 to 5 mole percent chromium. A patricularly preferred catalyst composition is one containing 70 to 80 mole percent nickel, 20 to 25 mole percent copper and 1 to 5 mole percent chromium.

The ammonolysis reaction is generally conducted at a temperature of from about 100° to about 300° C and a pressure of about 500 to 5000 psig created at least in part by the pressure of hydrogen introduced into the reaction vessel. Ammonia is introduced into the reaction such that there is a minimum of one mole of ammonia per hydroxyl group to be aminated. It is preferable that an excess, usually from 10 to 30 moles ammonia per hydroxyl group, be present. The reaction can be conducted either as a batch or continuous reaction.

Other methods of ammonolysis are known to those of ordiinary skill in the art which are satisfactory to provide the amino propoxy aliphatic hydrocarbon to be used to produce the beta-amino propionic acids of this invention.

The primary amine-containing material prepared as described above would have the formula:

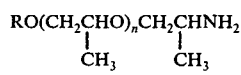

where R and $n$ have values as set forth above. This primary amine is reacted with acrylic acid or an organic acrylate such as methylacrylate, or the like.

The acrylic acid or organic acrylate is added in approximately equivalent quantities with the aminated propoxylate even though an excess of the acrylic acid may be used, even up to two to three times the molar amounts in the amine.

The reaction is conducted in the presence of a solvent such as water, lower aliphatic alcohols and polyhydric materials such as ethylene glycol, propylene glycol, glycerine and the like.

The reaction is conducted, with mixing, at from about 25° to about 200° C and preferably from about 60° C to about 160° C. The reaction is generally conducted under autogenous pressure but pressures from about ambient to about 10 atmospheres can be used. The reaction is normally conducted under a blanket of nitrogen or some other inert gas.

The alkoxypropoxypropyl beta-amino propionic acids of this invention surprisingly exhibit only slight reduction in solubility when the pH of the solution in which it is contained passes through the isoelectric range. Such range is usually considered to be characterized by a drastic reduction in solubility or where even insolubility of the amphoteric materials result. Further, the amino propionic acid surface active agents of this invention, while initially producing foam, such foam is extremely weak and quickly dissipates making the surface active agents of this invention particularly advantageous for use in detergents and cleaning materials wherein the absence of foam is desirable.

The above described invention and foregoing advantages and surprising properties are further illustrated by the following examples which are offered for purposes of illustration and not limitation of this invention.

EXAMPLE I

To a 1 liter, stainless steel, stirred autoclave was charged the following mixture:

140 g — Aminated EPAL 1012* 1.5 mole propoxylate (n=0.5)
36 g — Acrylic Acid
150 g — Deionized water
0.3 g — p-methoxyphenol (radical inhibitor)

*EPAL 1012 is a mixture of linear alcohols from Ethyl Corp., consisting of 0.1% $C_6$ alcohol, 0.6% $C_8$ alcohol, 77.0% $C_{10}$ alcohol, 21.6% $C_{12}$ alcohol, and 0.6% $C_{14}$ alcohol.

The solution was heated for 4 hours at 140° C and autogenous pressure. Upon cooling, a clear, brownish liquid with a viscosity at 25° C of 247 centistokes was recovered. The pH of a 1% solution of the active ingredient was 6.9.

EXAMPLE II

To a 1 liter, stainless steel autoclave were charged the following:

307.5 g — Aminated 2-ethylhexanol-13.7 mole propoxylate (n=12.7)
331.5 g — Deionized water
24.0 g — Acrylic acid (glacial)
0.3 g — p-methoxyphenol (radical inhibitor)

The reaction mixture was heated, with stirring, to 140° C under autogenous pressure and maintained at 140° C for 4 hours, then cooled. The resulting brownish liquid had a viscosity of 303 centipoise at 25° C.

EXAMPLE III

In a procedure similar to Example II, the following materials were combined and heated under a nitrogen atomsphere:

150.0 g — Aminated EPAL 1012 - 2 mole propoxylate (n = 1)
188.8 g — Deionized water
38.8 g — Acrylic acid The product had a pH of 5.38 in 10 wt. % active aqueous solution. NMR analysis showed that a Michael type addition of the amine to the double bond of the acid had occurred to give the beta-amino propionic acid.

EXAMPLE IV

This example, Runs 1 through 5, shows that the foaming tendencies of a propoxylate-containing beta-amino acids of the invention are considerably less than commercially available beta-amino acid amphoterics derived from aliphatic fatty aminos. The data illustrates lower foaming and less stable foams for the propoxylate containing materials, a desirable feature for many surfactant applications. Ross Miles foam height experimental data were obtained at 120° F, a concentration of 0.5 wt. % active ingredient and a pH of 6 (Run No. 4 had a pH of 5).

| Run No. | Surfactant | Foam Height (mm) | |
|---|---|---|---|
| | | Initial | 5 Min. |
| 1 | of Example III | 171 | 7 |
| 2 | of Example I | 168 | 74 |
| 3 | of Example II | 41 | 5 |
| 4 | Armeen Z[1] | 190 | 160 |
| 5 | Deriphat 151C[2] | 176 | 161 |

[1]The amphoteric reaction product of a primary coco amine and crotonic acid (N-cocoaminobutyric acid)
[2]N-coco, beta-amino propionic acid, 45% solution in $H_2O$.

| | | |
|---|---|---|
| pour point, ° F | | 65.0 max |
| pH (10% in $H_2O$) | | 6.5 min. |
| | | 7.5 max. |
| Non-reacted primary amine | | 5.0 % max. |
| Specific gravity | | 0.9 |
| Viscosity, SSU at | 25° C | 247.0 |
| | 35° C | 163.0 |
| | 45° C | 118.0 |
| | 55° C | 65.0 |

The data in the foregoing table closely demonstrates that, even though the amino acids of this invention produce a foam initially, the foam quickly breaks down thus making them superior to prior art amphoterics known for their strong foaming tendencies.

EXAMPLE V

This example, runs 6 through 10, shows that the beta-amino acids containing propoxy groups are excellent wetting agents as illustrated by the results of Draves wetting tests. Surfactant solutions were prepared in deionized water at 0.1% by weight active ingredient without adjusting the pH. Data are presented in the table below, including examples of commercially available beta-amino acids using a hook weighing 1.5 grams.

| Run | Surfactant | Wetting time (sec) |
| --- | --- | --- |
| 6 | of Example I | 17.5 |
| 7 | of Example II | 12.0 |
| 8 | of Example III | 10.0 |
| 9 | Deripaht 151C | 17.3 |
| 10 | Armeen Z | 17.0 |

EXAMPLE VI

This example, runs 11–23, illustrates the variation of wetting properties with changing acidity and alkalinity. The wetting times using propoxylate-containing amino acids may be seen to vary much less with pH than the aliphatic amino acids which are insoluble at their isoelectric points. Draves wetting times, (1.5 gram hook), were determined as in Example V. The data also illustrates that the propoxylated materials of this invention are better wetting agents in caustic solution than the commercial aliphatic materials. The pH was adjusted with 0.5 N HCl or 0.5 N NaOH unless otherwise noted. The wetting times are also shown in 5 wt. % sulphuric acid and sodium hydroxide solutions. The prior art amphoterics show more than twice the wetting times of those of this invention when in 5 wt. % NaOH solution.

| Run | Surfactant | pH | Wetting time (sec) |
| --- | --- | --- | --- |
| 11 | of Example III | 5% H$_2$SO$_4$ | 20.7 |
| 12 | of Example III | 2 | 26.4 |
| 13 | of Example III | 3 | 14.5 |
| 14 | of Example III | 4 | 14.7 |
| 15 | of Example III | 6 | 16.7 |
| 16 | of Example III | 10 | 12.0 |
| 17 | of Example III | 5% NaOH | 23.3 |
| 18 | of Example II | 7 | 13.1 |
| 19 | of Example II | 3.7 | 14.1 |
| 20 | Armeen Z | 6.3 | 17.0 |
| 21 | Armeen Z | 5% NaOH | 59.7 |
| 22 | Deriphat 151C | 3.7 | 20.0 |
| 23 | Deriphat 151C | 5% NaOh | 52.0 |

EXAMPLE VII

To illustrate further the surface activity of the propoxy containing beta-amino acids of this invention, the following surface tension data were collected on 0.1% and 0.01%, by weight, active solutions in deionized water.

| | | Surface Tension dynes/cm | |
| --- | --- | --- | --- |
| Run | Surfactant | 0.1% soln. | 0.01% soln. |
| 24 | of Example III | 28.9 | 28.9 |
| 25 | of Example I | 25.9 | — |

EXAMPLE VIII

Commercially available beta-amino acids derived from aliphatic amines such as coco amine (i.e., DERIPHAT 151C) are reported to be insoluble at pH values in the range of the isoelectric point. At the isoelectric point the surfactant properties of these derivatives are substantially reduced. The propoxy-containing amino acids of this invention retain their solubility throughout the pH scale as illustrated by the data below.

Titration of solutions of the surface active agents, first with 0.5 N-hydrochloric acid, then with 0.5 N sodium hydroxide were performed. Any insolubility was noted as the pH was recorded. A commercially available prior art beta-amino acid is included for comparison.

| Run | Surfactant | Concentration wt% | Initial pH | Insolubility Range (pH Units |
| --- | --- | --- | --- | --- |
| 26 | of Example III | 1.0 | 5.3 | (Soluble pH 2 to 11.5) |
| 27 | of Example III | 10.0 | 5.4 | (Soluble pH 1 to 11.4) |
| 28 | of Example II | 1.0 | 5.0 | Slight turbidity at pH 5.5 to 8.5 |
| 29 | Deriphat 151C | 1.0 | 6.4 | Insoluble at pH 3.43 to 4.91 |

The compound of Example III was completely soluble at higher and lower pH than those recorded as evidenced by its complete solubility in 5% H$_2$SO$_4$ and 5% NaOH.

EXAMPLE IX

While foam heights are claimed to vary substantially with pH for prior art commercially available beta-amino acid surfactants, the initial foam heights of the propoxylate-containing materials of this invention show only small variation.

The Ross Miles foam heights were determined on 0.5 wt. % solutions of the composition of Example III. Deionized water was used to prepare the samples.

| pH | Foam Height (mm) at 120° F Surfactant of Example III | Foam Height (mm) at 30° C DERIPHAT 151* |
| --- | --- | --- |
| 2 | 176 | — |
| 3 | 180 | 90 |
| 4 | 176 | 10 |
| 6 | 171 | 190 |
| 10 | 175 | 220 |

Included for comparison is data on a commercial coco amine-based amino acid derived from graph contained in General Mills Technical Bulletin 15-B c 1972.
*DERIPHAT 151 is sodium N-cocoaminopropionate.

EXAMPLE X

To a one liter flask, equipped with a mechanical stirrer and thermometer, were charged 36 g acrylic acid and 350 g deionized water under a nitrogen atmosphere. While cooling the flask, 139 g of aminated EPAL 1012-2 mole propoxylate was added through an addition funnel, so that the temperature did not exceed 13° C to prevent the Michael addition from occurring between the aminated propoxylate and acrylic acid. A sample was taken of the solution after standing overnight at room temperature (Sample A). The remainder of the solution was heated to 95° C and held at temperature for 8 hours, then cooled to give a yellowish solution (Sample B).

To illustrate the improved characteristics of the reacted mixture (beta-amino acid) over the simple mixture of amine and acid (salt), the Draves wetting test on 0.1% active aqueous solutions was performed on both the salt (Sample A) and the beta-amino acid (Sample B) using the 1.5 gram hook.

| Run | Surfactant | Draves Wetting Time (sec) |
|-----|------------|---------------------------|
| 30  | A          | 98                        |
| 31  | B          | 14                        |

As may be seen from the example, the beta-amino acid product is a superior wetting agent to the mere mixture of reactants.

From the foregoing description and examples, many modifications of the practice of the above invention will be apparent to those of ordinary skill in the art without departing from the scope and spirit of this invention.

We claim:

1. Low-foaming, surface active beta-amino propionic acids of the formula:

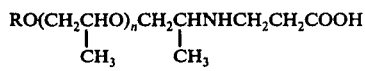

where R is a $C_6$ to $C_{18}$ aliphatic hydrocarbon radical and $n$ has an average value of from 0 to about 13.

2. The surface-active agent of claim 1 wherein R is a $C_8$ to $C_{12}$ alkyl group and $n$ has an average value of from about 0.5 to about 1.0.

3. The surface-active agent of claim 1 wherein $n$ has an average value of from 1 to about 13.

4. An improved detergent composition containing from about 0.1 wt. % to about 10 wt. % of a beta-amino propionic acid of the formula:

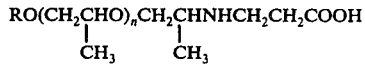

where R is a $C_6$ to $C_{18}$ aliphatic hydrocarbon radical and $n$ has an average value of from 0 to about 13, the beta-amino propionic acid in the detergent composition maintaining water solubility in a pH range of 1 to 11.

* * * * *